United States Patent [19]
Anderson

[11] 3,854,771
[45] Dec. 17, 1974

[54] COVER FOR TRAILERS

[75] Inventor: Robert DuWayne Anderson, Murdock, Minn.

[73] Assignee: TCI, Inc., Benson, Minn.

[22] Filed: Nov. 13, 1972

[21] Appl. No.: 305,840

[52] U.S. Cl. .............................. 296/137 B, 105/377
[51] Int. Cl. ............................................. B60j 7/02
[58] Field of Search ............... 296/137 B, 101, 100; 105/377, 378; 298/23 R

[56] References Cited
UNITED STATES PATENTS

| | | | |
|---|---|---|---|
| 2,330,670 | 9/1943 | Black | 105/378 |
| 2,899,912 | 8/1959 | Janeczko | 105/377 |
| 3,008,759 | 11/1961 | Stiefel et al. | 105/377 |
| 3,169,492 | 2/1965 | Stiefel et al. | 105/377 |
| 3,416,835 | 12/1968 | Ohle | 296/100 |
| 3,628,828 | 12/1971 | Page et al. | 296/137 B |

FOREIGN PATENTS OR APPLICATIONS

| | | | |
|---|---|---|---|
| 233,413 | 9/1963 | Austria | 296/137 B |
| 79,991 | 1/1951 | Czechoslovakia | 296/137 B |
| 863,950 | 3/1961 | Great Britain | 296/101 |

*Primary Examiner*—David Schonberg
*Assistant Examiner*—Michael J. Forman
*Attorney, Agent, or Firm*—Dugger, Johnson & Westman

[57] ABSTRACT

A hardtop cover for mobile storage boxes, primarily agricultural trailers, that is mounted on roller carriages over the top of the box walls so that it can be slid transversely from its closed position, and then tilted downwardly along one side of the box to completely open the top of the box without having heavy, hard to manage, swinging hinged doors. The cover can also easily be replaced by tilting and reverse roller movement.

14 Claims, 9 Drawing Figures

PATENTED DEC 17 1974

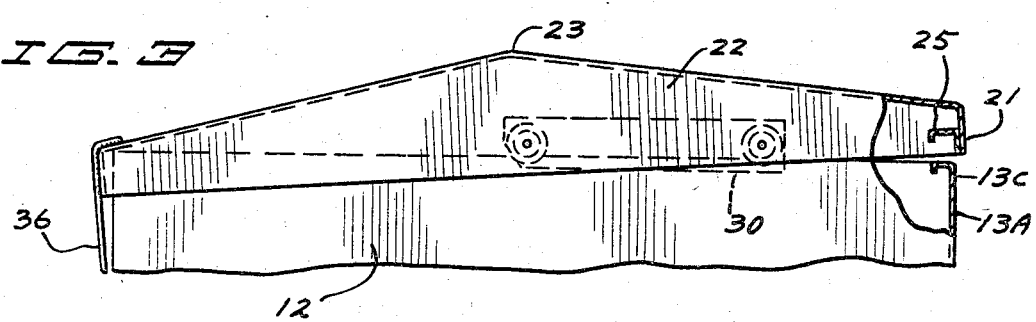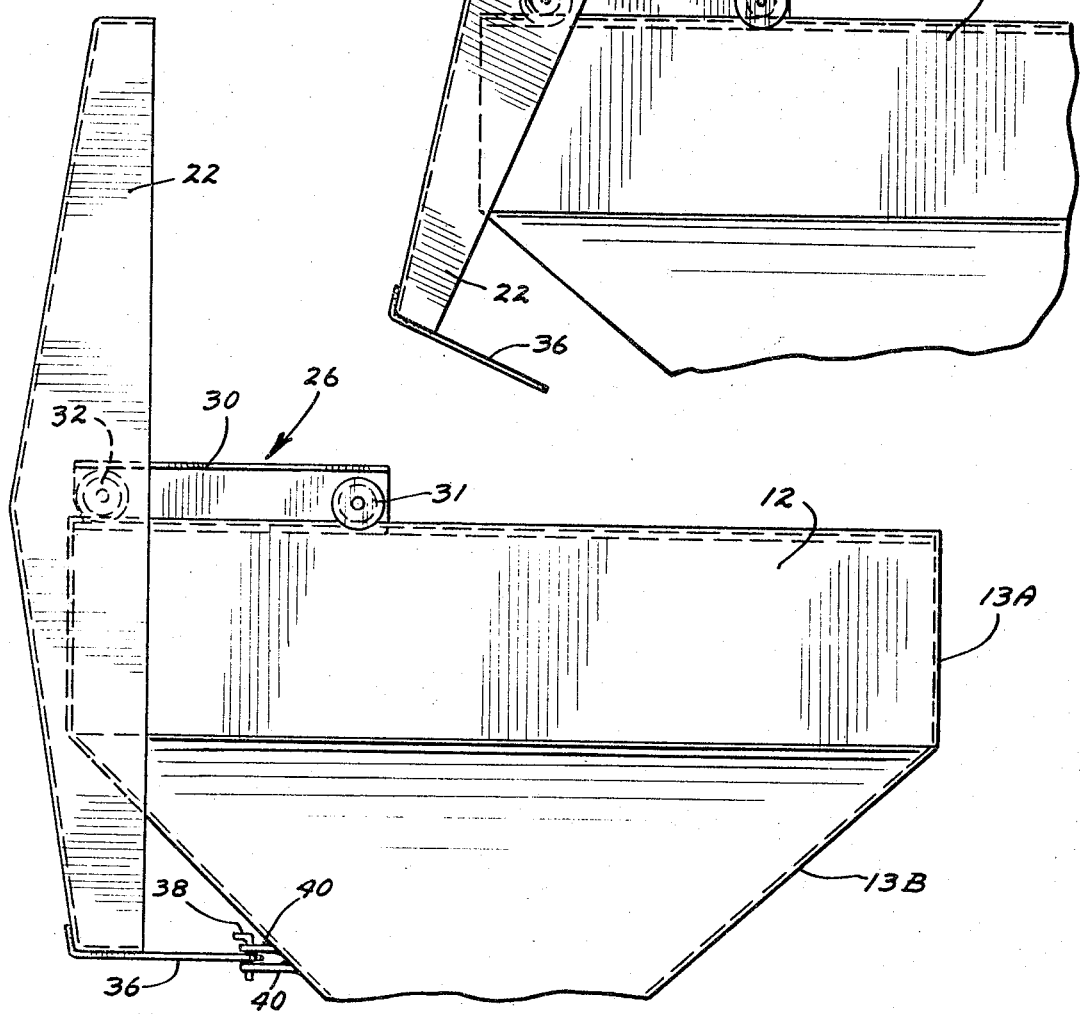

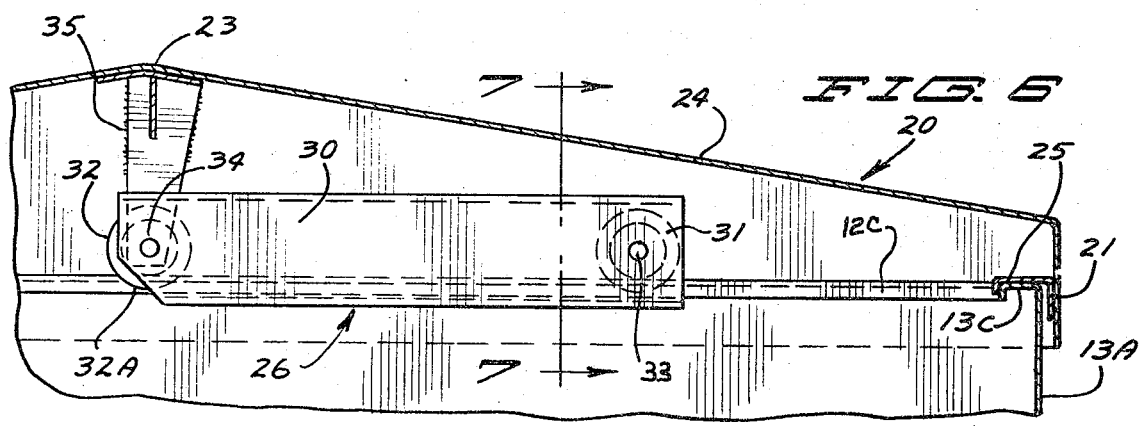
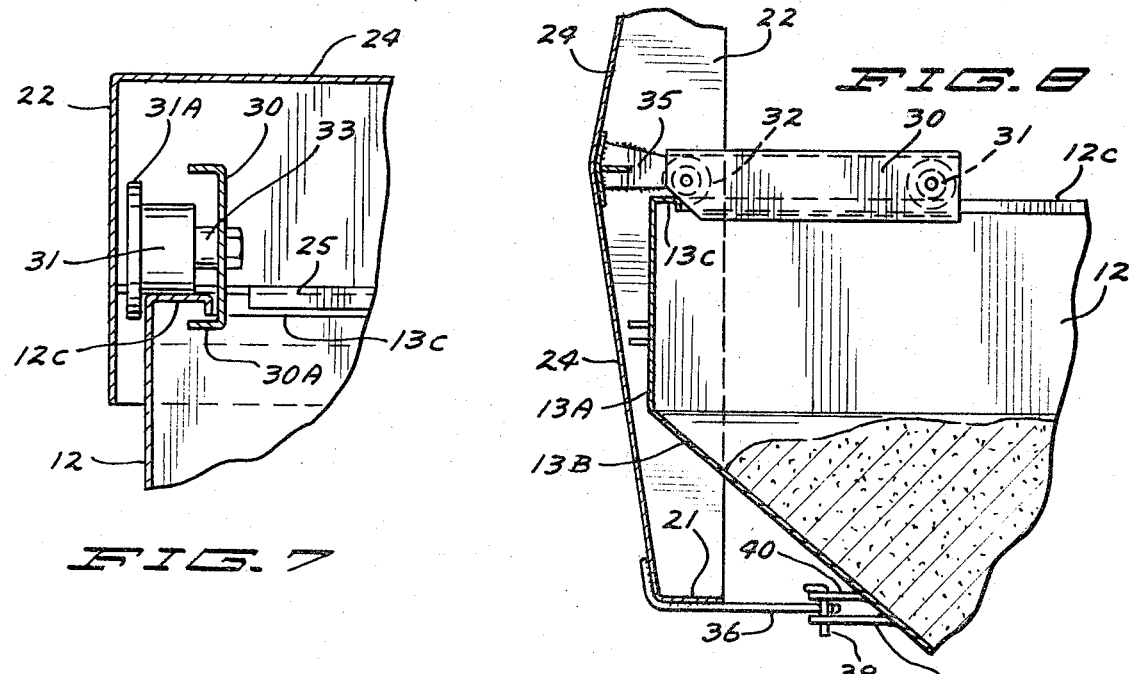
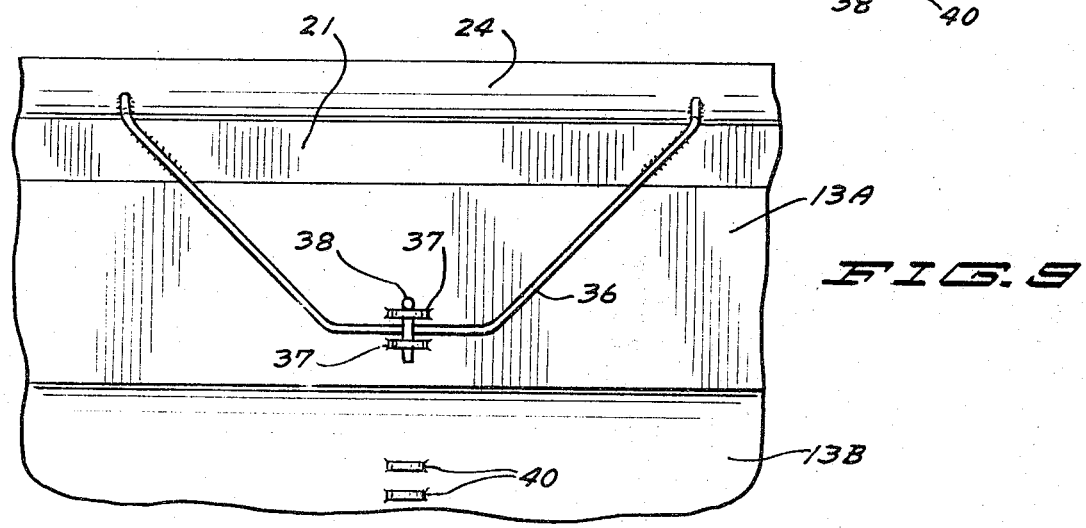

COVER FOR TRAILERS

BACKGROUND OF THE INVENTION

1. Field of the Invention

The present invention relates to hardtop covers for open boxes, primarily of the agricultural trailer type.

2. Prior Art

U.S. Pat. No. 2,899,912 issued to W. A. Janeczko shows a box car having a cover which can be moved transversely to the box and tilted for opening. However, the cover is mounted on hydraulic cylinders and the transverse or sideways movement is controlled by a second hydraulic cylinder. The operation of the cover therefore requires hydraulic power, and hydraulic controls for operating the cylinders. The pivot point for tilting the cover actually is moved down below the level of the box car top so the device must be power operated.

U.S. Pat. No. 2,979,361 issued to C. E. Eppinger et al. illustrates a split cover for a truck box wherein the separate sections open to the respective sides of the box, and these covers are difficult to open because they usually are quite heavy to pivot.

U.S. Pat. No. 3,169,492 issued to C. J. Stiesel et al. illustrates a tiltable roof structure that rides on rollers, but the cover is a split type cover, not a unitary cover. The unit is supported on support members that are pivoted below the roof line of the structure shown in this patent.

SUMMARY OF THE INVENTION

The present invention relates to a hardtop unitary cover that can be placed onto open top mobile storage boxes, and which is mounted so that it can be opened by one person. The unit is mounted on roller carriages that roll along the provided flanges on the top of the box. The cover may be rolled sideways on the roller carriages until it can be tilted downwardly so that approximately one-half of the cover extends below the level of the top of the box, and one-half of the cover extends above the level of the top of the box and the cover generally extends in a vertical plane. This leaves the entire box top completely open for filling or for servicing.

The unitary hardtop cover can be replaced over the box top simply by reversing the procedure, and the cover can be locked in either its open or its closed positions.

The cover is thus easy to handle, and can be made relatively weather proof. The cover is not easily damaged from negligent handling because it pivots around a balance axis, and is not banged open and closed.

The cover and it supporting carriages are relatively easy to install on existing boxes, and are easily adapted to use with a wide variety of boxes. The primary purpose of the cover is for covering open top trailers which are used for hauling an organic fertilizer and other farm commodities that are damaged by weather.

BRIEF DESCRIPTION OF THE DRAWINGS

FIG. 3 is a fragmentary front view showing the cover of the present invention in the first stages of removal;

FIG. 4 is a view showing the cover partially opened;

FIG. 5 is a front view showing the cover in its full open position;

FIG. 6 is a sectional view taken as on line 6—6 in FIG. 1;

FIG. 7 is a sectional view taken as on line 7—7 in FIG. 6;

FIG. 8 is a sectional view of the cover and box showing the cover in its full open position; and FIG. 9 is a fragmentary side view of the cover locking member taken as on line 9—9 in FIG. 2.

DESCRIPTION OF THE PREFERRED EMBODIMENTS

Figure 1:
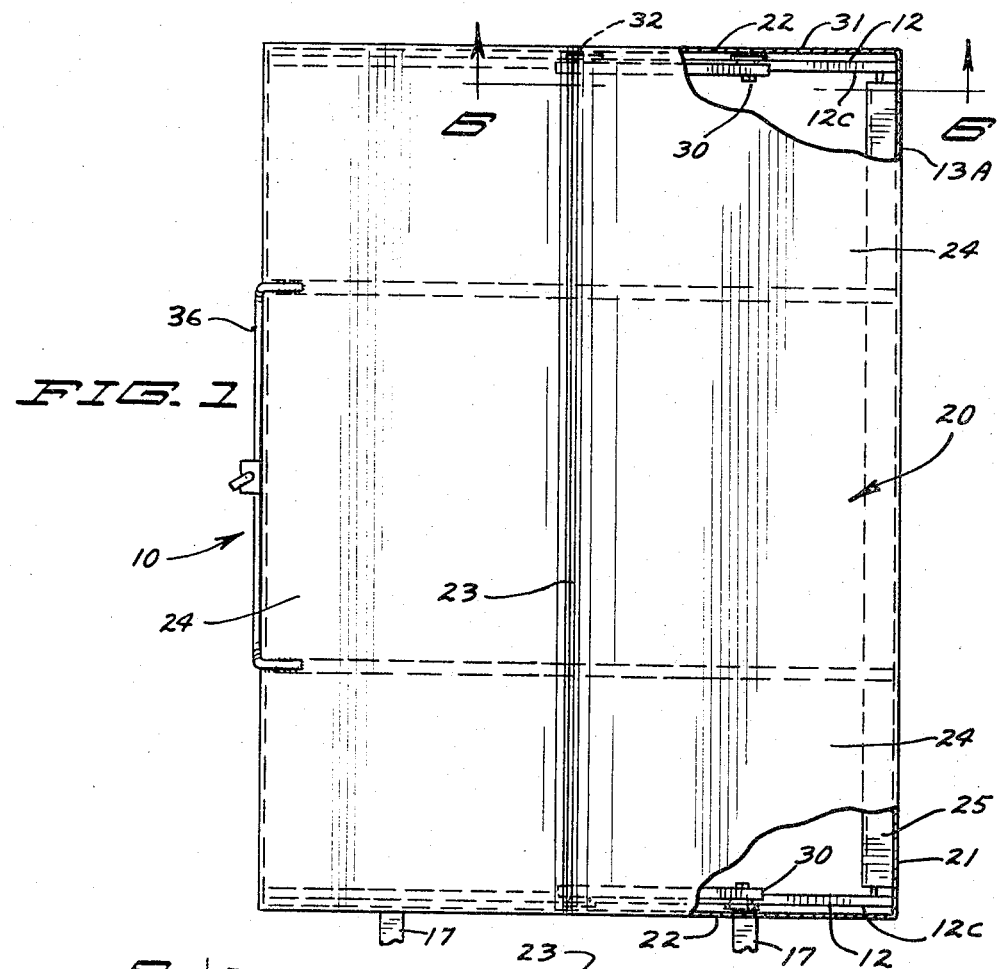
FIG. 1 is a top plan view of a trailer and box having a cover made according to the present invention installed thereon.
Figure 2:
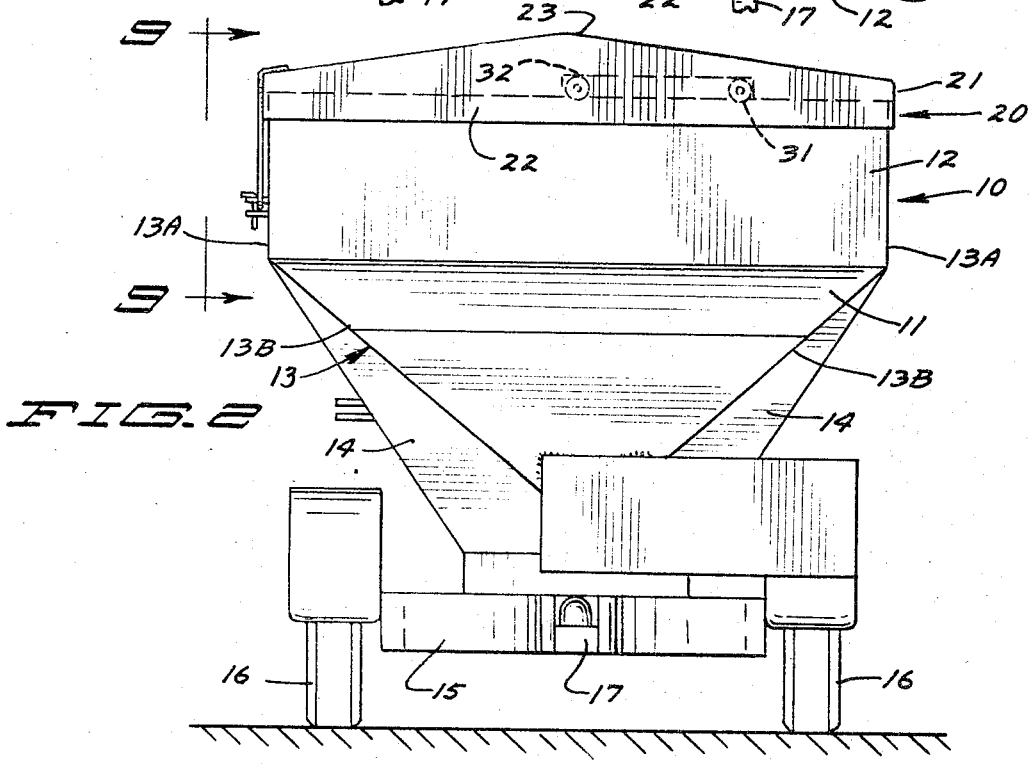
FIG. 2 is a front elevational view of the device of FIG. 1.

A trailer indicated generally at 10 comprises an open top box body member 11 that has front and rear end walls 12, and side walls 13. The side walls 13 are formed to have vertically extending upper portions 13A and inwardly tapering lower portions 13B. The end walls 12 also may have inwardly tapered lower portions as well. Suitable support members 14 are provided for bracing and supporting the side walls, and the entire body assembly is mounted onto a running gear illustrated generally at 15 that includes tires 16,16 and a hitch pole 17 that extends forwardly from the body member.

The running gear of course can be of any desired type, and the box cover that is about to be explained can be utilized with truck mounted boxes, or trailer boxes. However, the primary use that is shown herein is for an organic fertilizer spreader trailer that is used in the field, and has an open top defined by the side and end walls.

The upper edges of side walls 13, and the end walls 12 each are provided with inwardly bent flanges 13C and 12C, respectively, and the flanges have upper surfaces that define the top level or plane of the upper edges of the box. As shown, a cover member indicated generally at 20 is mounted over the top of the trailer box, and the cover member includes downwardly depending side walls 21, and front and rear downwardly extending walls 22. The walls 22 are cut so that they provide a slope from the center portions 23 thereof down to the outer edges where walls 21 are positioned. Top panels 24 are attached to the end walls and slope outwardly and downwardly from the center area 23. The walls 21 are attached to the edges of the top panels 24. The cover is made as a unit and the outer walls 21 and 22 are of size to fit outside of the outer surfaces of the box walls 12 and 13. The cover may be fabricated and reinforced as desired.

A support flange 25 is attached to one of the side walls 21 of the cover, on the interior of the cover, and this support flange is made so that it will rest upon the flange 13C of one of the side walls 13.

The cover 20 is supported on the top of the box through the use of track guides or supports including, as shown, roller carriages indicated generally at 26. The roller carriages are made to provide support for rolling movement of the cover transversely along the upper surfaces of the flanges 12C of the end walls 12. The roller carriages comprise elongated channel shaped members 30 that rotatably mount individual rollers 31 and 32 at opposite ends thereof. The rollers can be of any desired configuration, and include flanges 31A and 32A on their outer sides that ride on the outside of the walls 12, as shown. The channel members 30 include lower legs 30A that fit underneath the flanges 12C on the inside of the box. The rollers 31 and 32 are rotatably mounted on suitable support pins 33 and 34 that position the channel members 30 properly so that the rollers 31 and 32 will ride on the upper flanges 12C of the walls 12.

The support pins 34 for the rollers 32 have a separate bracket 35 pivotally mounted thereon as well. The lower ends of the brackets 35 are pivotally attached to the pins 34 and the upper ends of the bracket 35 is fixedly attached to the cover assembly. The brackets 35 can be welded to the top panels 24, and reinforced as desired. The brackets 35 are positioned to the inside of the channel members 30 and permit pivotal movement of the cover relative to the roller carriages.

The roller carriages are held onto the flanges 12C (which form roller tracks) by the lower leg 30A of the channels 30. The legs 30A prevent the channels from lifting up off the box, and the flanges 31A and 32A on the rollers serve to capture the flanges 12C once the carriages are assembled in place.

On the opposite longitudinal side of the cover member 20 from the support flange 25, a handle and lock member 36 is fixedly attached to the wall 21. As shown, the handle 36 is merely a bent rod, (generally in a U shape) that is fixed to the cover 20 and extends downwardly along the side of the cover and box. The handle is made so that it will fit into and between a pair of lugs 37 that are fixed or suitably welded or attached to the side wall 13A. A pin 38 can be passed through openings in the lugs so that the handle can be locked into place. The handle can be sprung out when the cover is to be removed, a sufficient distance to clear the lugs, after pin 38 is removed.

The handle 36 also can be locked to the box when the cover is in open position, as can be seen in FIG. 8. Lugs 40 are fixed to the wall 13B and are spaced apart a distance sufficient to permit the bottom part of handle 36 to fit between them, and the pin 38 can be used to again hold the handle trapped between the lugs 40. The lugs 40 have aligned openings for passage of pin 38.

The locking of the handle 36 with the cover in closed or open positions insures that the cover member will be supported properly in either position.

When the cover member 20 is to be opened from its closed position, the first step is to release the pin 38, and spring the handle 36 so that it clears the lugs 37. Then the handle is pulled downwardly slightly and the cover will pivot about the shafts 34 of the rollers 32. It should be noted that the pivot axis of brackets 35 is approximately in the center of the cover so that the cover 20 is near balance with respect to this axis. The side of cover assembly 20 where handle 36 is attached is depressed sufficiently so that the support 25 clears the flange 13C on the opposite side of the box and the wall 21 on that opposite side also clears the upper edge of the wall 13. Then the cover assembly can be rolled sideways, toward the person operating the unit. The rollers 31 and 32 on each end of the box will roll along the upper flanges 12C. The cover will move laterally, and as shown in FIG. 4 in a partially open position, the cover may be moved to position where it can be tilted down along the opposite side wall 13 from the side where flange 25 rests. The pivoting of the cover in its relatively balanced position is easy because the pivot axis is substantially in the center of the cover.

The cover is pulled and tilted over the top of the lateral side of the box as shown in FIG. 5, to position where the ends of channel members 30 will strike against suitable stop members, for example the flange 13C on that side of the box, as shown in FIG. 8. The channel members 30 can be trimmed to fit against the stop surfaces so that the rollers will not roll off the unit but will insure that the brackets 35 are positioned to permit the required pivoting of the cover. If desired additional reinforcing stops can be provided, for example small gussets in the corners of the box could be used for stop members.

In any event when the roller carriages are in their extreme lateral position the cover member can be tilted about the pivot axis of bracket 35 to a substantially vertical position as shown in FIG. 5 and also in FIG. 8. The handle 36 is positioned so that it will fit between the lug members 40, and with pin 38 passing through lugs 40 the cover is held in its open position where it cannot fall or hurt anybody. Then the box can be filled as desired or serviced, if desired.

When the cover is to be replaced, the pin 38 is removed from the brackets 40, and the handle 36 is pulled out, the cover is tilted so that the side of the cover carrying the flange 25 is lowered (again this is a substantially balanced condition) and the entire cover is rolled transversely back toward the opposite side of the box on the roller carriages. The cover can be lowered gently until it is in proper position with the flange 25 resting on the flange 13C for the opposite side wall. The handle 36 is latched into place in lugs 37 and the unit is ready to go again.

Resilient seals can be used for weather seals, and the flange 25 can have rubber bumpers for shock absorption. Further an additional latch can be used on the side of the cover opposite handle 36 for positive retention of the cover.

The support for the cover could be slidable guides as well as roller carriages, although rollers make moving the cover convenient and easy.

What is claimed is:

1. A removable cover for an open topped storage box having upright walls that are spaced apart, comprising carriage means, track means on the upright walls to mount said carriage means for substantially planar movement transverse to the storage box and along the top of said box, a unitary, one piece cover member, means to pivotally mount said cover member to said carriage means about a single pivotal axis, said track means mounting said carriage means permitting movement of said cover member and carriage means in a transverse direction to position wherein the means to pivotally mount said cover member to said carriage means is positioned with respect to one lateral side wall of said box so that the pivotal axis is adjacent the top of the box and along said one lateral side thereof to permit said cover member to tilt about said pivotal axis into a substantially vertical position along said one lateral side of said box and on the outside thereof with portions of the cover member extending to a height above the top of the box and other portions of the cover member extending below the top of the box.

2. The combination as specified in claim 1 wherein said track means are positioned along an upper portion of said box so that when said cover member is tilted to its substantially vertical position, substantially one-half of the cover member extends above the top of said box.

3. The combination as specified in claim 1 wherein said means to mount said carriage means comprise flange means attached to two of said walls of said box and defining the upper edges of said two walls.

4. The combination as specified in claim 1 wherein said box is rectilinear in plan view, and said carriage means comprise roller carriage means positioned for movement along the top edges of the spaced opposite walls, and support means on at least one other wall for supporting an edge of said cover member in closed position covering the opening defined by said box.

5. The combination as specified in claim 4 and means attached to said cover member and cooperating with additional means on said box operative to releasably lock said cover member in its closed position, and separate means to releasably lock said cover member in its substantially vertical position.

6. The combination as specified in claim 4 wherein said means to mount said roller carriage means comprises flanges on said opposite walls of said box, and said roller carriage means comprise channel shaped members having rollers rotatably mounted thereon, said channel shaped members having legs extending underneath said flange means on the interior of said box, and said rollers having edge flanges extending downwardly below the upper level of said opposite walls on the outside thereof.

7. The combination as specified in claim 6 and stop means to stop said roller carriage means from moving laterally relative to said box beyond a predetermined position.

8. In a mobile storage box comprising side wall means joined together to form an open topped box, the improvement comprising a cover member for said box, said cover member having peripheral edges and being a nonfoldable, unitary self supporting cover of size to cover substantial portions of the open top of said box in a first cover position, support means to support said cover member relative to said box adjacent the top thereof for movement of said cover member transversely to said box, means to pivotally mount said cover member with respect to said support means about a pivot axis intermediate the edges of said cover member, said cover member being movable on said support means to a position with the pivot axis extending adjacent the top of the box and along one lateral side of said box wherein said cover member can be tilted without folding about said pivot axis to an open position with portions of the cover member extending along the one lateral side of said box below the top of said box.

9. The combination as specified in claim 8 wherein said support means includes a pair of carriages, means defining track means for said carriages on two spaced walls of said box adjacent the top edges of said box, said cover being pivotally mounted to said carriages and said track means being fixed to said walls of said box and providing the sole guides for said carriages.

10. In a mobile storage box comprising wall means having top edges joined together to form an open topped box, the improvement comprising a cover member for said box, said cover member being of size to cover at least portions of the open top of said box in a first position, track means comprising flange members mounted on two spaced apart walls of said box, a pair of carriages, one on each of said track means, means to pivotally mount said cover member with respect to and for movement with said carriages about a pivot axis, said cover member being movable with said carriages along said track means to an open position with said pivot axis extending adjacent one lateral side of said box and generally above the level of said one lateral side wherein said cover member can be tilted about said pivot axis with portions of the cover member extending along the one lateral side of said box below the top of said box, and stop means to prevent said carriages from moving along said track means toward said one lateral side beyond a preselected position.

11. In a mobile storage box comprising wall means joined together to form an open topped box, said wall means having upper edges terminating generally along a common plane, the improvement comprising a cover member for said box, said cover member being of size to cover the open top of said box in a first position, flange means at the upper edges of said wall means, carriage means movable along said flange means in direction transversely to said box, means to pivotally mount said cover member with respect to said carriage means about a pivot axis near a balancing axis of said cover member, said cover member and carriage means being movable on said flange means to a position with said pivot axis extending adjacent one lateral side of said box wherein said cover member can be tilted about said pivot axis to an open position with portions of the cover member extending along the one lateral side of said box below the upper edges of said wall means.

12. In a mobile storage box comprising wall means joined together to form an open topped box, the improvement comprising a cover member for said box, said cover member having peripheral wall means and being of size to cover the open top of said box in a first cover position with the peripheral wall means substantially encompassing the box, support means comprising track means on the box and carriage means on the cover member to support said cover member relative to said box for movement transversely to said box, means to pivotally mount said cover member with respect to said carriage means about a pivot axis, said cover member and carriage means being movable on said track means to a position with the pivot axis extending adjacent and in direction along one lateral side of said box whereby said cover member can be tilted about said pivot axis to an open position with portions of the cover member extending along the one lateral side of said box below the top of said box.

13. The combination as specified in claim 12 and bracket means between the cover member and the pivot axis, said bracket means being of size so that the pivot axis of the cover member overlies the space defined by the periphery of said box when the cover member is in position to be tilted.

14. The combination as specified in claim 12 and bracket means between the cover member and pivot axis of sufficient length to permit the cover member to be tilted so that the peripheral wall means of said cover member on an opposite side of said box from the one lateral side may be raised above the top of said box to permit lateral movement of said cover member relative to said box.

* * * * *